(12) United States Patent
Sudo

(10) Patent No.: US 8,547,080 B2
(45) Date of Patent: Oct. 1, 2013

(54) VOLTAGE REGULATOR

(75) Inventor: Minoru Sudo, Chiba (JP)

(73) Assignee: Seiko Instruments Inc., Chiba (JP)

( * ) Notice: Subject to any disclaimer, the term of this patent is extended or adjusted under 35 U.S.C. 154(b) by 32 days.

(21) Appl. No.: 13/424,580

(22) Filed: Mar. 20, 2012

(65) Prior Publication Data

US 2012/0242316 A1    Sep. 27, 2012

(30) Foreign Application Priority Data

Mar. 24, 2011    (JP) .................................. 2011-065833

(51) Int. Cl.
*G05F 1/635*    (2006.01)

(52) U.S. Cl.
USPC .......................................................... 323/311

(58) Field of Classification Search
USPC ................. 323/269, 271, 273–280; 361/91.5
See application file for complete search history.

(56) References Cited

U.S. PATENT DOCUMENTS

| | | | | |
|---|---|---|---|---|
| 3,913,026 A | * | 10/1975 | Koehler ......................... | 330/277 |
| 5,164,872 A | * | 11/1992 | Howell .............................. | 361/3 |
| 5,910,874 A | * | 6/1999 | Iniewski et al. .................. | 361/56 |
| 6,128,171 A | * | 10/2000 | Iniewski et al. .................. | 361/56 |
| 6,208,123 B1 | * | 3/2001 | Sudo .............................. | 323/280 |
| 6,212,050 B1 | * | 4/2001 | Haider ............................. | 361/86 |
| 6,586,958 B2 | * | 7/2003 | Sudo et al. ..................... | 323/282 |
| 6,801,033 B2 | * | 10/2004 | Sudo et al. .................. | 324/750.3 |
| 6,989,659 B2 | * | 1/2006 | Menegoli et al. ............. | 323/274 |
| 7,129,652 B2 | * | 10/2006 | Patel et al. .................... | 315/291 |
| 2005/0237682 A1 | * | 10/2005 | Wu et al. ......................... | 361/56 |
| 2005/0254183 A1 | * | 11/2005 | Ishida et al. ..................... | 361/18 |
| 2009/0027023 A1 | * | 1/2009 | Sudo .............................. | 323/282 |

FOREIGN PATENT DOCUMENTS

JP    04-195613 A    7/1992

* cited by examiner

*Primary Examiner* — Adolf Berhane
*Assistant Examiner* — Nusrat Quddus
(74) *Attorney, Agent, or Firm* — Brinks Hofer Gilson & Lione

(57) ABSTRACT

Provided is a voltage regulator capable of preventing a large current from flowing even when a battery (110) is connected with reverse polarity by mistake. The voltage regulator employs a circuit configuration in which a substrate potential (n-well) of an output transistor (103) of the voltage regulator is not fixed to a potential of a VDD terminal, and a power supply of a reference voltage circuit (101) and an error amplifier (102) is not fixed to the VDD terminal.

2 Claims, 3 Drawing Sheets

US 8,547,080 B2

VOLTAGE REGULATOR

RELATED APPLICATIONS

This application claims priority under 35 U.S.C. §119 to Japanese Patent Application No. 2011-065833 filed on Mar. 24, 2011, the entire content of which is hereby incorporated by reference.

BACKGROUND OF THE INVENTION

1. Field of the Invention

The present invention relates to a voltage regulator capable of preventing a large current from flowing when a battery is connected with reverse polarity by mistake.

2. Description of the Related Art

As a conventional voltage regulator, a circuit as illustrated in FIG. 4 is known (see, for example, Japanese Patent No. 2706720 (FIG. 1)).

A battery 110 has a positive terminal connected to a VDD terminal 121 and a negative terminal connected to a VSS terminal (GND) 123. A load 111 is connected to a VOUT terminal 122.

A reference voltage circuit 101 outputs a constant voltage (reference voltage), which is applied to an inverting input terminal of an error amplifier 102. A voltage at the VOUT terminal 122 is divided by resistors 104 and 105, and the divided voltage is applied to a non-inverting input terminal of the error amplifier 102. An output transistor 103 has a source and a substrate which are connected to the VDD terminal 121, a drain connected to the VOUT terminal 122, and a gate connected to an output of the error amplifier 102. The resistance value of the output transistor 103 is controlled by the output of the error amplifier 102. That is, when the voltage obtained by dividing the voltage (output voltage) at the VOUT terminal by the resistors 104 and 105 is lower than the output voltage of the reference voltage circuit 101, the output of the error amplifier 102 decreases so as to strongly bias the output transistor 103 to decrease the resistance value. Then, the voltage at the VOUT terminal 122 increases. On the other hand, when the voltage divided by the resistors 104 and 105 is higher than the reference voltage, the output transistor 103 is weakly biased to increase the resistance value so that the voltage at the VOUT terminal 122 decreases. In this way, the voltage regulator is controlled so that a constant voltage is output to the VOUT terminal 122.

In general, the circuit of the error amplifier 102 is typified by a differential amplifier circuit as illustrated in FIG. 5. A positive input terminal 721 and a negative input terminal 722 of the error amplifier 102 are connected to gates of N-channel transistors 701 and 702, respectively. The N-channel transistors 701 and 702 have sources connected to a constant current source 705 in common. The N-channel transistor 701 has a drain connected to a gate and a drain of a P-channel transistor 703 and to a gate of a P-channel transistor 704. The N-channel transistor 702 has a drain connected to a drain of the P-channel transistor 704. An EOUT terminal 723 corresponds to an output terminal of the error amplifier 102.

The N-channel transistors 701 and 702 have parasitic diodes 701D and 702D, respectively, whose anodes are connected to VSS and cathodes are connected to the drains. The P-channel transistors 703 and 704 have parasitic diodes 703D and 704D, respectively, whose anodes are connected to the drains and cathodes are connected to VDD.

In the conventional voltage regulator, when the battery 110 is connected to the VDD terminal and the VSS terminal of the voltage regulator with reverse polarity, the parasitic diodes 701D and 703D and the parasitic diodes 702D and 704D are connected in the forward direction, respectively, and then a large current flows through the path.

Further, a large current flows through the voltage regulator via the load 111 or a protective element (not shown) provided between the VOUT terminal 122 and the VSS terminal and via a parasitic diode 103D of the output transistor 103.

SUMMARY OF THE INVENTION

Therefore, the present invention has been made to solve the problems described above, and has an object to provide a voltage regulator capable of preventing a large current from flowing even when a battery is connected with reverse polarity.

The present invention employs a circuit configuration in which a substrate potential of an output transistor of the voltage regulator is not fixed to a potential of a VDD terminal, and a power supply of a reference voltage circuit and an error amplifier is not fixed to the VDD terminal, thereby solving the above-mentioned problems.

According to the voltage regulator of the present invention described above, even when the battery is connected with reverse polarity, a large current does not flow through the voltage regulator and the breakdown can be prevented.

DETAILED DESCRIPTION OF THE PREFERRED EMBODIMENTS

Embodiments of the present invention are described with reference to the drawings.
(First Embodiment)

Figure 1:
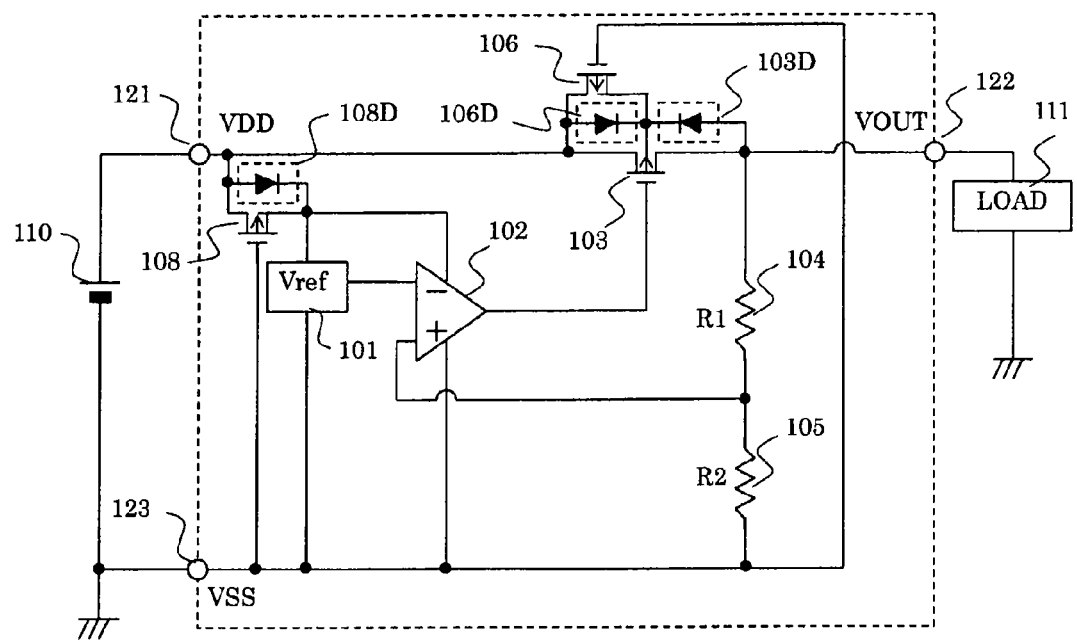
FIG. 1 is a circuit diagram of a voltage regulator according to a first embodiment of the present invention.
Figure 4:
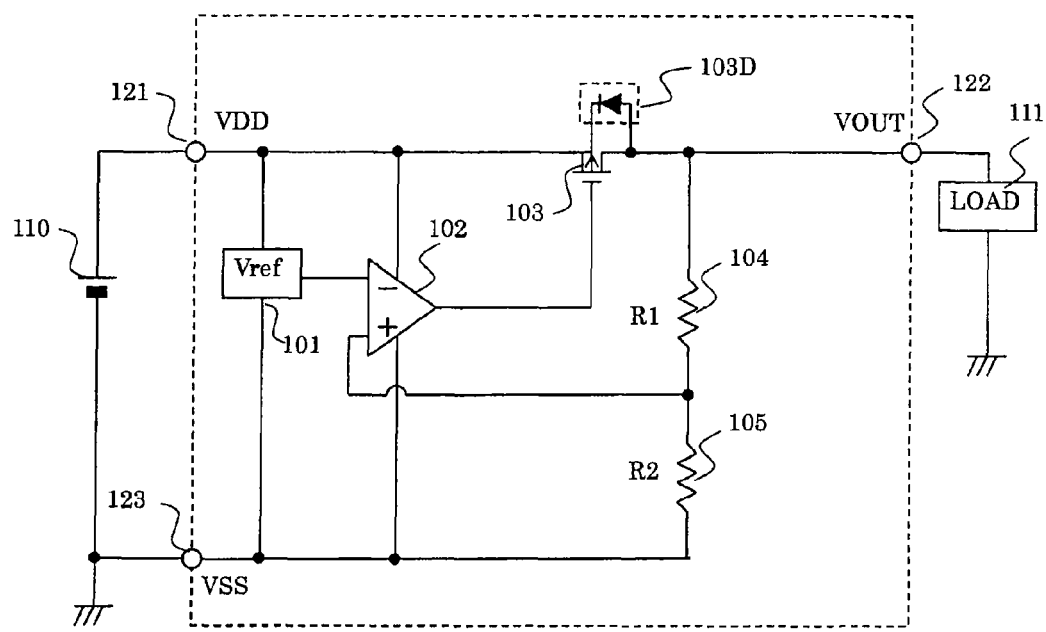
FIG. 4 is a circuit diagram illustrating a conventional voltage regulator.

FIG. 1 is a circuit diagram of a voltage regulator according to a first embodiment of the present invention. The voltage regulator according to the first embodiment includes a reference voltage circuit 101, an error amplifier 102, a resistor 104, a resistor 105, a P-channel transistor 103, P-channel transistors 106 and 108, a VDD terminal 121, a VSS terminal 123, and a VOUT terminal (output terminal) 122. The difference from FIG. 4 resides in that the P-channel transistors 106 and 108 are added and the substrate (well) of the P-channel transistor 103 is connected to a source of the P-channel transistor 106. The reference voltage circuit 101 and the error amplifier 102 are connected to the VDD terminal 121 via the P-channel transistor 108.

Next, the operations performed when the battery 110 is normally connected and reversely connected are described. FIG. 1 illustrates the state in which the battery 110 is normally connected. In this state, both the P-channel transistors 106 and 108 are turned ON, and the substrate potential of the P-channel transistor 103 becomes equal to the potential of the VDD terminal 121. Then, the power supply of the reference voltage circuit 101 and the error amplifier 102 is connected to the VDD terminal 121, and the same operation as that of the conventional voltage regulator is performed.

On the other hand, when the battery 110 is reversely connected, both the P-channel transistors 106 and 108 are turned OFF. When the P-channel transistor 106 is turned OFF, the substrate (well) of the P-channel transistor 103 becomes a floating state. In the conventional voltage regulator, the VOUT terminal 122 and the VDD terminal 121 are connected to each other via the parasitic diode 103D. In the voltage regulator of FIG. 1, however, a parasitic diode 106D of the P-channel transistor 106 is connected in the reverse direction, and hence a current is prevented from flowing back from the VOUT terminal 122 to the VDD terminal 121.

Figure 5:
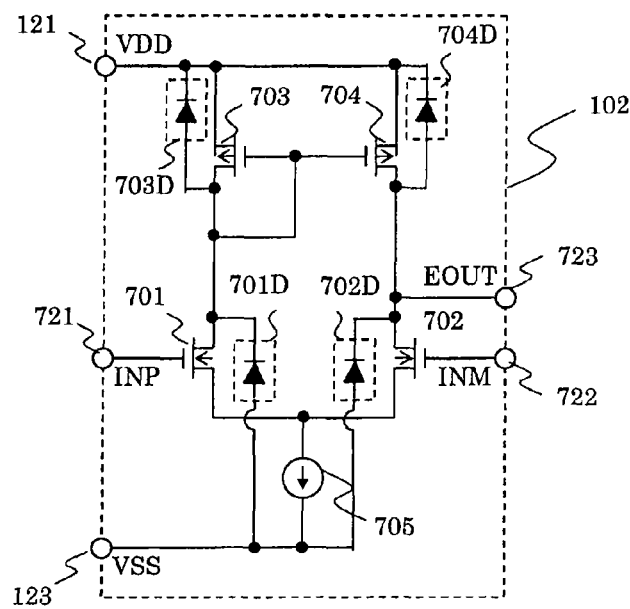
FIG. 5 is a circuit diagram of a commonly-used error amplifier of a voltage regulator.

Further, by a parasitic diode 108D of the P-channel transistor 108, the currents caused by the parasitic diodes 701D and 703D and the parasitic diodes 702D and 704D of the error amplifier of FIG. 5 can be blocked.

In this case, a substrate (well) of a P-channel transistor to be connected to the positive power supply of the error amplifier 102 and the reference voltage circuit 101 needs to be connected to a source thereof and to the source of the P-channel transistor 108.

(Second Embodiment)

Figure 2:
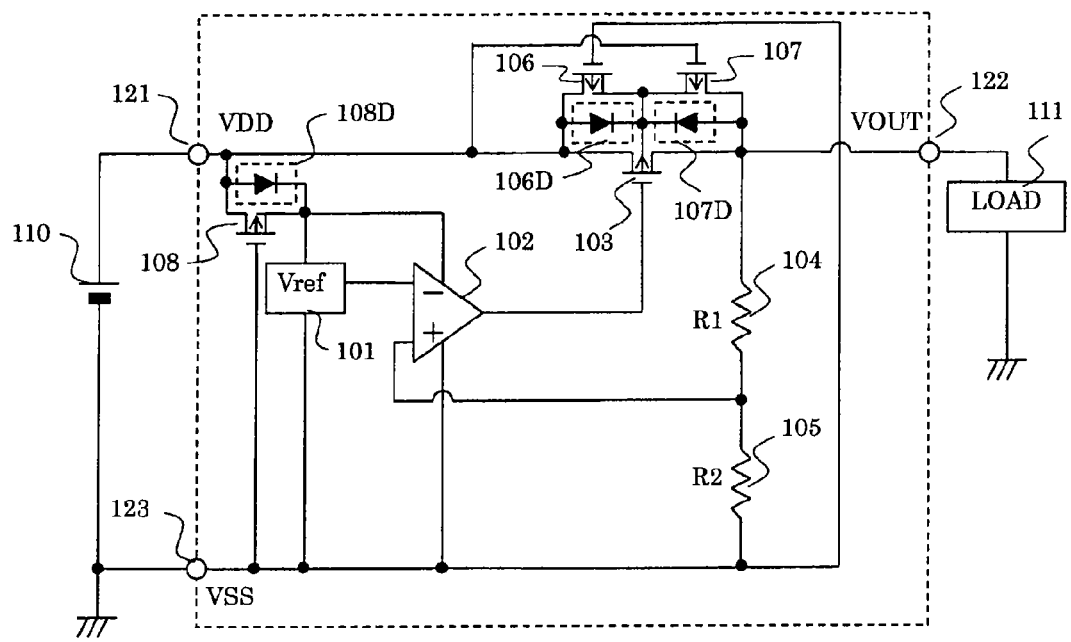
FIG. 2 is a circuit diagram of a voltage regulator according to a second embodiment of the present invention.

FIG. 2 is a circuit diagram of a voltage regulator according to a second embodiment of the present invention. The difference from the voltage regulator of FIG. 1 resides in that a P-channel transistor 107 is added. As illustrated in FIG. 2, when the battery 110 is normally connected, the P-channel transistor 107 is turned OFF, and hence the voltage regulator according to the second embodiment of the present invention performs the same operation as that of the conventional voltage regulator.

On the other hand, when the battery 110 is reversely connected, the P-channel transistor 107 is turned ON, and hence the substrate (well) of the P-channel transistor 103 according to the second embodiment has the same potential as that of the VOUT terminal, though the substrate (well) of the P-channel transistor 103 according to the first embodiment becomes a floating state. In general, the presence of a floating substrate (well) leads to the fear that the substrate potential fluctuates due to noise or the like to be latched up. In the case of the second embodiment, however, the substrate potential hardly fluctuates and the fear of the latch-up is reduced.

Further, in the first embodiment, when the parasitic diode 103D of the P-channel transistor 103 is turned ON by a leakage current of the P-channel transistor 106, a parasitic pnp transistor whose collector is the VDD terminal side of the P-channel transistor 103 is turned ON, and a current flows from the VOUT terminal to the VDD terminal. In the second embodiment, however, the P-channel transistor 107 is turned ON and hence the parasitic diode 103D of the P-channel transistor 103 is not turned ON. Therefore, no current flows due to the parasitic pnp transistor.

Figure 3:
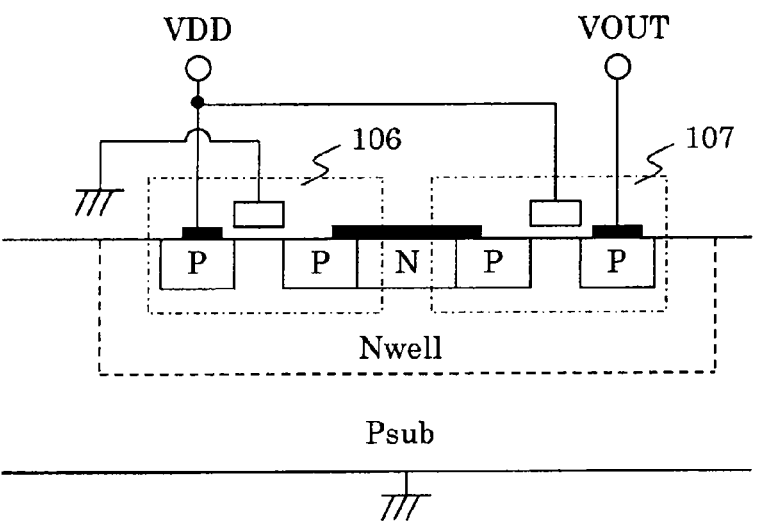
FIG. 3 is a cross-sectional diagram of P-channel transistors 106 and 107 of the voltage regulator according to the second embodiment of the present invention.

FIG. 3 illustrates a cross-sectional diagram of the P-channel transistors 106 and 107. An N-type substrate (Nwell) is formed on a P-type substrate (Psub), and the P-channel transistors 106 and 107 are provided in the N-type substrate (Nwell). The P-channel transistor 106 has a gate connected to the VSS terminal (P-type substrate) and a drain connected to the VDD terminal. The P-channel transistor 107 has a gate connected to the VDD terminal and a drain connected to the VOUT terminal. The P-channel transistors 106 and 107 have sources and N-type substrates (Nwells) which are connected to the same potential as that of an N-type substrate (Nwell) of the P-channel transistor 103 (not shown) in common.

As described above, according to the voltage regulator of the present invention, even when the battery 110 is connected with reverse polarity, a large current is prevented from flowing.

Note that, in FIG. 5, a typical single-stage differential amplifier circuit is exemplified, but the error amplifier circuit of the voltage regulator according to the present invention is not limited to this circuit configuration. The same effects can be obtained with any other circuit configuration.

What is claimed is:

1. A voltage regulator, comprising:
    a positive power supply terminal, a negative power supply terminal, and an output terminal;
    a first P-channel transistor provided between the positive power supply terminal and the output terminal;
    a differential amplifier circuit for controlling a gate voltage of the first P-channel transistor so that a voltage at the output terminal becomes constant;
    a second P-channel transistor including a gate connected to the negative power supply terminal, a drain connected to the positive power supply terminal, and a source connected to a substrate (n-well) thereof, for connecting a substrate (n-well) of the first P-channel transistor to the positive power supply terminal; and
    a third P-channel transistor including a gate connected to the negative power supply terminal, a drain connected to the positive power supply terminal, and a source connected to a substrate (n-well) thereof, for connecting a positive power supply of the differential amplifier circuit to the positive power supply terminal,
    wherein the substrate (n-well) of the first P-channel transistor is connected to the substrate (n-well) of the second P-channel transistor, and
    wherein the positive power supply of the differential amplifier circuit is connected to the substrate (n-well) of the third P-channel transistor.

2. A voltage regulator according to claim 1, further comprising a fourth P-channel transistor including a gate connected to the positive power supply terminal, a drain connected to the output terminal, and a source connected to a substrate (n-well) thereof, for connecting the substrate (n-well) of the first P-channel transistor to the output terminal.

* * * * *